(12) United States Patent
Carinci et al.

(10) Patent No.: US 12,529,740 B2
(45) Date of Patent: Jan. 20, 2026

(54) METHOD FOR OPERATING A MAGNETIC RESONANCE APPARATUS, MAGNETIC RESONANCE APPARATUS, AND COMPUTER PROGRAM PRODUCT

(71) Applicant: Siemens Healthcare GmbH, Erlangen (DE)

(72) Inventors: Flavio Carinci, Würzburg (DE); Dominik Paul, Bubenreuth (DE)

(73) Assignee: Siemens Healthineers AG, Forchheim (DE)

( * ) Notice: Subject to any disclaimer, the term of this patent is extended or adjusted under 35 U.S.C. 154(b) by 176 days.

(21) Appl. No.: 18/370,872

(22) Filed: Sep. 20, 2023

(65) Prior Publication Data

US 2024/0103110 A1 Mar. 28, 2024

(30) Foreign Application Priority Data

Sep. 22, 2022 (DE) ...................... 10 2022 209 976.1

(51) Int. Cl.
*G01V 3/00* (2006.01)
*G01R 33/36* (2006.01)
*G01R 33/54* (2006.01)

(52) U.S. Cl.
CPC ....... *G01R 33/543* (2013.01); *G01R 33/3614* (2013.01)

(58) Field of Classification Search
CPC .............. G01R 33/287; G01R 33/4835; G01R 33/5608; A61B 2090/374

USPC .......................................................... 324/309
See application file for complete search history.

(56) References Cited

U.S. PATENT DOCUMENTS

| 2015/0097566 A1* | 4/2015 | Grodzki | ............... G01R 33/543 |
| | | | 324/322 |
| 2015/0285885 A1 | 10/2015 | Feiweier et al. | |

FOREIGN PATENT DOCUMENTS

| CN | 108171488 A * | 6/2018 | ............ G06F 16/25 |
| DE | 102014206636 A1 | 10/2015 | |
| EP | 2952989 A1 * | 12/2015 | ............ B21D 43/11 |
| EP | 3632298 A1 * | 4/2020 | ........... A61B 5/0004 |
| JP | 2018093989 A * | 6/2018 | |
| WO | WO-2020178196 A1 * | 9/2020 | ............ G16H 30/20 |

* cited by examiner

*Primary Examiner* — Walter L Lindsay, Jr.
*Assistant Examiner* — Frederick Wenderoth
(74) *Attorney, Agent, or Firm* — Lempia Summerfield Katz LLC

(57) ABSTRACT

A method for operating a magnetic resonance apparatus, a magnetic resonance apparatus, and a computer program product are provided. According to the method, an initial MR scan protocol is provided. At least one boundary condition, such as a performance-limiting boundary condition, that is dependent on the patient and/or the MR apparatus is provided. Based on the initial MR scan protocol, at least two sub-protocols are generated. Each of the at least two sub-protocols is checked as to whether the at least one boundary condition is complied with when the respective sub-protocol is applied.

16 Claims, 4 Drawing Sheets

METHOD FOR OPERATING A MAGNETIC RESONANCE APPARATUS, MAGNETIC RESONANCE APPARATUS, AND COMPUTER PROGRAM PRODUCT

This application claims the benefit of German Patent Application No. DE 10 2022 209 976.1, filed on Sep. 22, 2022, which is hereby incorporated by reference in its entirety.

BACKGROUND

The present embodiments relate to a method for operating a magnetic resonance apparatus, a magnetic resonance apparatus, and a computer program product In medical technology, imaging using magnetic resonance (MR), also referred to as magnetic resonance tomography (MRT) and magnetic resonance imaging (MRI), is characterized by high soft-tissue contrast. For this, a patient is typically positioned in an examination space of an MR apparatus. During an MR scan, radio-frequency (RF) transmit pulses may be radiated into the patient according to an MR protocol (e.g., an MR sequence), with, for example, the aid of a radio-frequency antenna unit of an MR apparatus. The transmit pulses generated excite nuclear spins in the patient, whereby gradient pulses trigger spatially encoded MR signals. The MR signals are received by the MR apparatus as MR data and used for the reconstruction of MR maps.

To operate the radio-frequency antenna unit, the MR apparatus may include one or more radio-frequency amplifiers that amplify a signal describing the transmit pulse. The signal amplified by the radio-frequency amplifier is transmitted to one or more antennas of the radio-frequency antenna unit so that the one or more antennas may radiate the desired transmit pulse.

Usually, such a radio-frequency amplifier is configured to store a specific amount of electrical charge (e.g., in one or more capacitors) and retrieve the electrical charge in a short time when required (e.g., when a transmit pulse is output by the radio-frequency antenna unit). However, the radio-frequency amplifier is, for example, limited with regard to its output performance (e.g., when an MR sequence is applied, the available output performance represents a boundary condition to be complied with, which is dependent on the MR apparatus, such as on the nature of the MR apparatus).

Absorption of the transmit pulses in the patient's body causes energy (e.g., thermal energy) to be introduced into the patient's body. The specific absorption rate (SAR) must not exceed specified limit values in order not to endanger the patient's safety. Hence, when an MR sequence is applied, the specific absorption rate represents a boundary condition to be complied with that is dependent on the patient.

Further boundary conditions that have to be complied with when an MR scan protocol is applied to record MR data from a patient using an MR apparatus. may be provided

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method that enables reliable and/or efficient compliance with at least one boundary condition when a magnetic resonance (MR) scan protocol is applied is provided.

Accordingly, a method for checking an MR scan protocol is provided. The MR scan protocol is suitable for recording MR data from a patient using an MR apparatus. Herein, it is checked as to whether at least one boundary condition is complied with when the MR scan protocol is applied. According to the method, an initial MR scan protocol is provided. Further, at least one boundary condition (e.g., a performance-limiting boundary condition) that is, for example, dependent on the patient and/or the MR apparatus is provided. Based on the initial MR scan protocol, at least two sub-protocols are generated. Each of the at least two sub-protocols is checked as to whether the at least one boundary condition is complied with when the respective sub-protocol is applied.

The initial MR scan protocol may, for example, be provided by a providing unit of the MR apparatus. For example, an MR scan protocol may be retrieved from a database and/or input and/or modified by an input unit of the MR apparatus.

An MR scan protocol (e.g., the initial MR scan protocol) may, for example, be an MR imaging protocol. An MR scan protocol (e.g., the initial MR scan protocol) may, for example, include one or more MR sequences (e.g., MR pulse sequences). The MR scan protocol may, for example, include a set (e.g., a complete set) of, for example, optimized parameters for a specific type of examination. The scan protocol may, for example, include information about a field of view (FOV) and/or the resolution of the MR scan to be performed.

The generation of the at least two sub-protocols based on the initial MR scan protocol may, for example, include splitting and/or separating the initial MR scan protocol into two sub-protocols. For example, the initial MR scan protocol may include a plurality of MR sequences (e.g., a first MR sequence and a second MR sequence) to be executed one after the other according to the initial MR scan protocol. A first of the at least two sub-protocols may, for example, include the first MR sequence; a second of the at least two sub-protocols may, for example, include the second MR sequence. For example, the plurality of MR sequences of the initial MR scan protocol may be suitable for recording MR data for various purposes. For example, the first MR sequence may be used to record reference data, and the second MR sequence may be used to record image data. The reference data and the image data are different types of MR data. For example, the at least two sub-protocols represent different parts of a recording method described by the initial MR scan protocol.

The checking of each of the at least two sub-protocols for compliance with the at least one boundary condition is, for example, a separate and/or distinct and/or individual and/or independent check of the respective sub-protocol. For example, a first sub-protocol may be checked separately and/or distinctly and/or independently of the second sub-protocol. For example, each of the at least two sub-protocols is checked individually as to whether the at least one boundary condition is complied with when it is applied. For example, the check is performed based on runtime information on all RF pulses of the (sub)protocol as to whether a radio-frequency amplifier is overloaded at a specific time or not.

The separate check of the at least two sub-protocols enables complex dependencies between parts of the recording process to be avoided. Nevertheless, there is still enough leeway to make the imaging as efficient as possible. This makes it possible to avoid overloading of a user interface with a large number of parameters.

If the check reveals that the at least one boundary condition for a sub-protocol of the at least two sub-protocols is not complied with, the sub-protocol may be adapted so that the at least one boundary condition is complied with when the sub-protocol is applied.

In one embodiment, the adaptation of the sub-protocol takes place separately and/or distinctly and/or individually and/or independently. In one embodiment, the sub-protocol is adapted separately and/or distinctly and/or individually and/or independently of any adaptation of another sub-protocol. For example, each sub-protocol to be adapted is adapted independently of other sub-protocols that are possibly to be adapted. For example, the adaptation of the sub-protocol takes place individually (e.g., similarly to the check of the sub-protocol).

In one embodiment, predetermined values of adaptation parameters are specified for the adaptation of the sub-protocol, such as, for example, a minimum flip angle, a maximum repetition time (TR), and/or a minimum recording range. The minimum recording range may, for example, be defined by a minimum number of k-space lines to be recorded. Further, a sequence may be specified in which the predetermined adaptation parameters are changed for compliance with the at least one boundary condition. For example, the adaptation of the sub-protocol is terminated if compliance with the at least one boundary condition is achieved after an adaptation parameter has been changed. Accordingly, a change according to the sequence of subsequent adaptation parameters is not performed. For example, the flip angle is changed first as an adaptation parameter; if the change to the flip angle does not yet result in compliance with the at least one boundary condition, TR is then changed, for example, in order to achieve compliance.

In one embodiment, a plurality of adaptation parameters (e.g., flip angle, TR, and/or recording range) are varied to provide that the at least one boundary condition is complied with when the sub-protocol is applied.

The at least one boundary condition may, for example, be a performance-limiting boundary condition or include a performance-limiting boundary condition. Such a boundary condition may, for example, describe a performance limit (e.g., a maximum performance capability) of a radio-frequency amplifier of the MR apparatus. Such a boundary condition may, for example, describe the electrical rechargeability and/or maximum electrical charging capacity and/or a limit to avoid overheating of a radio-frequency amplifier of the MR apparatus. The more generously a radio-frequency amplifier is dimensioned, the less quickly the radio-frequency amplifier usually reaches its performance limits.

Rechargeability may, for example, be described by a rate with which electrical recharging of the radio-frequency amplifier takes place. This may, for example, be expressed by the unit coulomb/second. The maximum electrical charging capacity may, for example, be described by the maximum electrical charge that may be (temporarily) stored and dissipated in order to send transmit pulses. This may, for example, be expressed by the unit coulomb.

A further possible boundary condition related to the MR apparatus is compliance with maximum strengths of magnetic field gradients and/or slew rates of magnetic field gradients that the MR apparatus is capable of applying. A magnetic field strength is usually expressed by the unit "mT/m"; a slew rate of the magnetic field is usually expressed by the unit "T/m/s".

The at least one boundary condition may, for example, describe a maximum specific absorption rate of the patient. A specific absorption rate may, for example, be patient-specific in that it is dependent on the patient's body mass. A further possible boundary condition relating to the patient is the avoidance of excessive stimulation (e.g., nerve stimulation, such as peripheral nerve stimulation (PNS)) of the patient by the application of magnetic field gradients.

The specific absorption rate may, for example, be the radio-frequency energy absorbed per unit of time and per kilogram of body weight after RF irradiation. The absorption of RF energy may lead to heating of patient's body tissue. An inadmissibly high local concentration of RF energy may result in RF burns (local SAR). If RF energy is uniformly distributed over the entire body, stress on the patient's thermoregulation or cardiovascular system is considerable (whole-body SAR). The at least one boundary condition may, for example, be a short-term SAR limit (e.g., a one-second SAR limit).

In one embodiment, the at least two sub-protocols include a sub-protocol for recording reference data, where the reference data is suitable for performing an MR recording acceleration technique. In one embodiment, the reference data includes MR recording data of reference lines in k-space.

In one embodiment, the at least two sub-protocols include a sub-protocol for recording image data where the image data is suitable for reconstructing at least one MR map taking into account the reference data. Such a sub-protocol for recording image data may include an imaging sequence. In one embodiment, one or more MR maps may be reconstructed from the image data. Herein, the image data may contain essential diagnostic information about the patient in the MR maps. The reference data may be only used as an auxiliary means for reconstructing the image data.

The MR recording acceleration technique may, for example, include a parallel imaging technique. The use of parallel imaging techniques with a plurality of receiving coils operating in parallel (e.g., parallel acquisition techniques, PAT) in MR imaging may reduce the acquisition time of image data or achieve a significantly higher resolution with the same acquisition time. This may take place by acquiring a reduced number of k-space lines in, for example, the phase encoding direction in the spatial frequency space than is usually necessary to satisfy the Nyquist theorem. Such techniques are known as "partial parallel acquisition (PPA)". In order to reconstruct MR maps with the same resolution from this undersampled k-space data, according to a sub-protocol of the at least two sub-protocols, undersampled and hence incomplete image data may be acquired with the aid of an array of a plurality of receiving coils.

Further, according to a further sub-protocol of the at least two sub-protocols, reference data is acquired (e.g., reference lines). The reference lines may be in each case acquired from each receiving coil of the plurality of receiving coils and may serve as calibration data points in order to match the incomplete data sets of different receiving coils to one another in order to generate complete image data. The reference lines may, for example, be acquired at low frequency in a central region of the k-space. Corresponding reconstruction methods, usually algebraic methods, are known from the prior art (e.g., SENSE (sensitive encoding) and GRAPPA (generalized autocalibration PPA)).

The MR recording acceleration technique may further include, for example, a simultaneous multi-slice (SMS) technique and/or a Deep Resolve technique.

In one embodiment, the method further includes generating a final (e.g., single) MR scan protocol based on the at least two sub-protocols that have been checked and possibly adapted. This enables the final MR scan protocol to be processed by the MR apparatus like any ordinary MR scan protocol. This provides that no further adaptation of the processing of the MR scan protocols and/or processing of control data described by the MR scan protocols is necessary. Any effort required to modify the MR apparatus may be kept low.

In one embodiment, the method further includes recording MR data from the patient according to the at least two sub-protocols that have been checked and possibly adapted (e.g., according to the final MR scan protocol). In one embodiment, one or more MR maps may be reconstructed based on the MR data.

In one embodiment, the generation of the at least two sub-protocols based on the initial MR scan protocol and the checking of each of the at least two sub-protocols as to whether the at least one boundary condition is complied with when the respective sub-protocol is applied only takes place if a preceding check of the initial MR scan protocol reveals that the at least one boundary condition is not complied with when the initial MR scan protocol is applied.

This enables the generation of the at least two sub-protocols based on the initial MR scan protocol and the checking of each of the at least two sub-protocols as to whether the at least one boundary condition is complied with when the respective sub-protocol is applied to be avoided.

Further, an MR apparatus configured to perform a method for checking an MR scan protocol as described above is provided. For this purpose, the MR apparatus may include a computing unit with one or more processors and/or memory modules. The computing unit may, for example, be configured as part of a system control unit of the MR apparatus.

The advantages of the MR apparatus of the present embodiments substantially correspond to the advantages of the method of the present embodiments for checking an MR scan protocol for recording MR data from a patient using an MR apparatus as to whether at least one boundary condition is complied with when the MR scan protocol is applied, as explained in detail above. Features, advantages, or alternative embodiments may also be transferred to the other subject matter and vice versa.

Further, a computer program product that includes a program and may be loaded directly into a memory of a programmable system control unit of an MR apparatus, and program means (e.g., libraries and auxiliary functions) for executing a proposed method when the computer program product is executed in the system control unit of the MR apparatus are provided. Herein, the computer program product may include software with a source code that still has to be compiled and linked, or only needs to be interpreted, or an executable software code that only needs to be loaded into the system control unit for execution.

The computer program product enables the method of the present embodiments to be executed quickly, identically repeatedly, and robustly. The computer program product may be configured such that the computer program product may execute the method acts of the present embodiments using the system control unit. Herein, the system control unit is, in each case, to fulfil the requisite conditions such as, for example, having an appropriate random-access memory, an appropriate graphics card, or an appropriate logic unit, so that the respective method acts may be executed efficiently.

The computer program product is, for example, stored on a computer-readable medium or held on a network or server from where the computer program product may be loaded into the processor of a local system control unit that is directly connected to the MR apparatus or may be embodied as part of the MR apparatus. Further, control information of the computer program product may be stored on an electronically readable data carrier. The control information of the electronically readable data carrier may be configured such that the control information performs a method of the present embodiments when the data carrier is used in a system control unit of an MR apparatus.

Examples of electronically readable data carriers (e.g., non-transitory computer-readable storage media) are a DVD, a magnetic tape, or a USB stick on which electronically readable control information (e.g., software) is stored. When this control information is read from the data carrier and stored in a system control unit of the MR apparatus, all embodiments of the above-described methods may be performed.

BRIEF DESCRIPTION OF THE DRAWINGS

Further advantages, features, and details of the invention will be apparent from the examples of embodiments described below and with reference to the drawings. Corresponding parts are given the same reference characters in all the figures.

DETAILED DESCRIPTION

Figure 1:
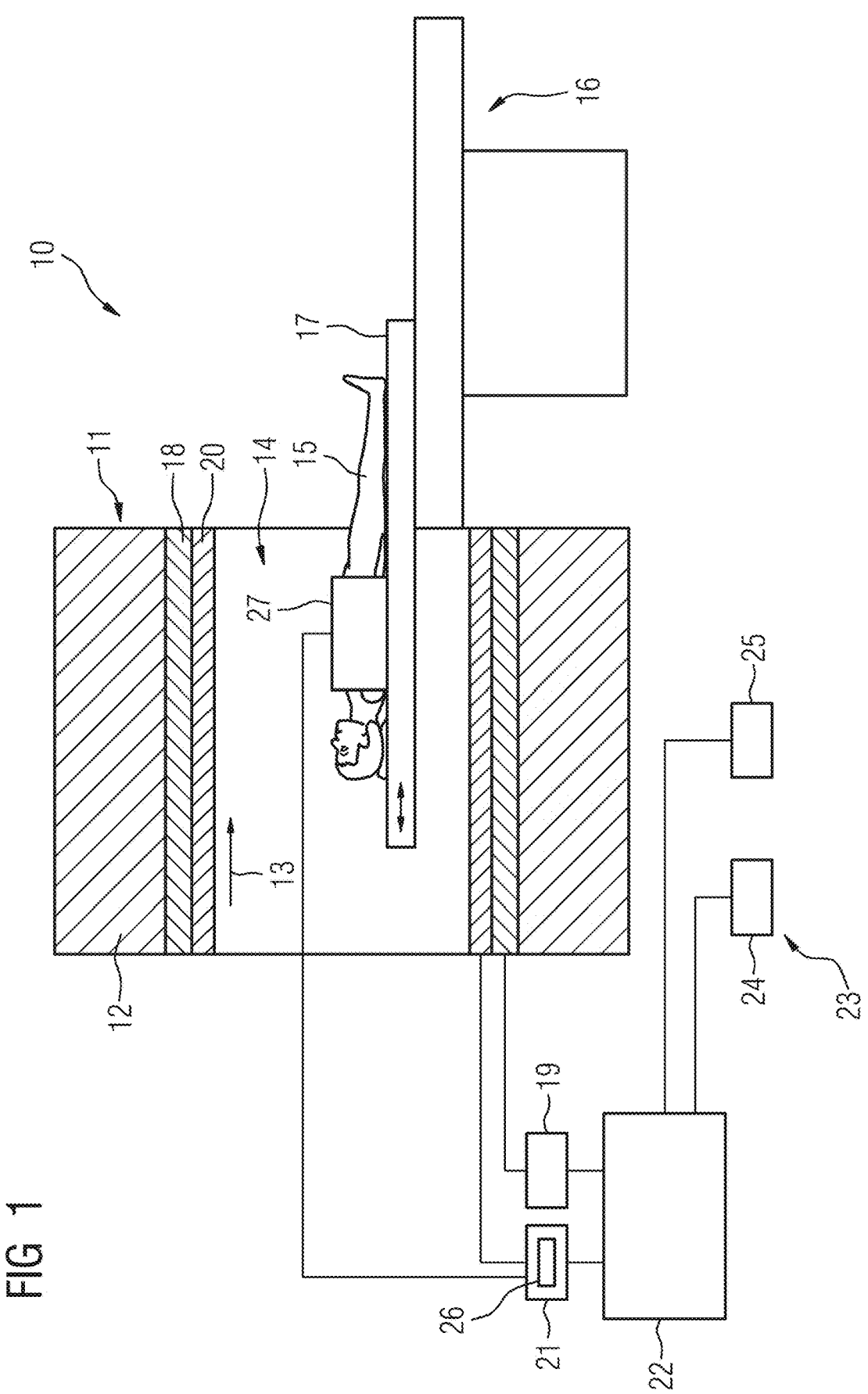
FIG. 1 shows one embodiment of a magnetic resonance (MR) apparatus.

FIG. 1 shows a schematic depiction of one embodiment of a magnetic resonance (MR) apparatus 10. The MR apparatus 10 includes a magnet unit 11 that has a main magnet 12 for generating a strong and, for example, temporally constant main magnetic field 13. In addition, the MR apparatus 10 includes a patient receiving region 14 for receiving a patient 15. In the present exemplary embodiment, the patient receiving region 14 is cylindrical in shape and is enclosed by the magnet unit 11 in a cylindrical shape in a circumferential direction. However, in principle, an embodiment of the patient receiving region 14 deviating from this is conceivable at any time. The patient 15 may be pushed into the patient receiving region 14 by a patient support apparatus 16 of the MR apparatus 10. For this purpose, the patient support apparatus 16 has a patient table 17 configured as movable within the patient receiving region 14.

The magnet unit 11 also has a gradient coil unit 18 for generating magnetic field gradients that are used for spatial encoding during imaging. The gradient coil unit 18 is controlled by a gradient control unit 19 of the MR apparatus 10. The magnet unit 11 also includes a radio-frequency antenna unit 20 that, in the present exemplary embodiment, is configured as a body coil that is integrated into the MR apparatus 10 in a fixed manner. The radio-frequency antenna unit 20 is controlled by a radio-frequency antenna control unit 21 of the MR apparatus 10 and radiates radio-frequency MR sequences into an examination space that is substantially formed by a patient receiving region 14 of the MR apparatus 10. This causes the main magnetic field 13 generated by the main magnet 12 to be subjected to excitation of atomic nuclei. Relaxation of the excited atomic nuclei generates MR signals. The radio-frequency antenna unit 20 is in principle configured to receive the MR signals. In this example, the MR apparatus includes a local coil 27 arranged directly on the patient 15. The local coil 27 includes a plurality of receiving coils spatially distributed within the local coil 27 each of which is configured to receive MR data in the form of an MR signal.

In order to transmit suitable electric signals to the radio-frequency antenna unit 20, the radio-frequency antenna control unit 21 includes one or more radio-frequency amplifiers 26 that may amplify a control signal from the system control unit 22 into a power signal. The radio-frequency amplifier is configured to temporarily store an electrical charge (e.g., a precharge) that the radio-frequency amplifier then dissipates on the amplification of a transmit pulse. For example, the radio-frequency amplifier is able to amplify transmit pulses with a high edge steepness. For storing the electrical charge, the radio-frequency amplifier may include at least one capacitor.

To control the main magnet 12, the gradient control unit 19, and to control the radio-frequency antenna control unit 21, the MR apparatus 10 has a system control unit 22. The system control unit 22 controls the MR apparatus 10 centrally, such as, for example, for the performance of a predetermined imaging MR sequence. In addition, the system control unit 22 includes an evaluation unit, not shown in more detail, for evaluating the MR signals acquired during the MR examination. Further, the MR apparatus 10 includes a user interface 23 connected to the recharge system control unit 22. Control information such as, for example, imaging parameters and reconstructed MR maps may be displayed to a medical operator on a display unit 24 (e.g., on at least one monitor) of the user interface 23. Further, the user interface 23 has an input unit 25 by which information and/or parameters may be entered by the medical operator during a scanning process.

Figure 2:
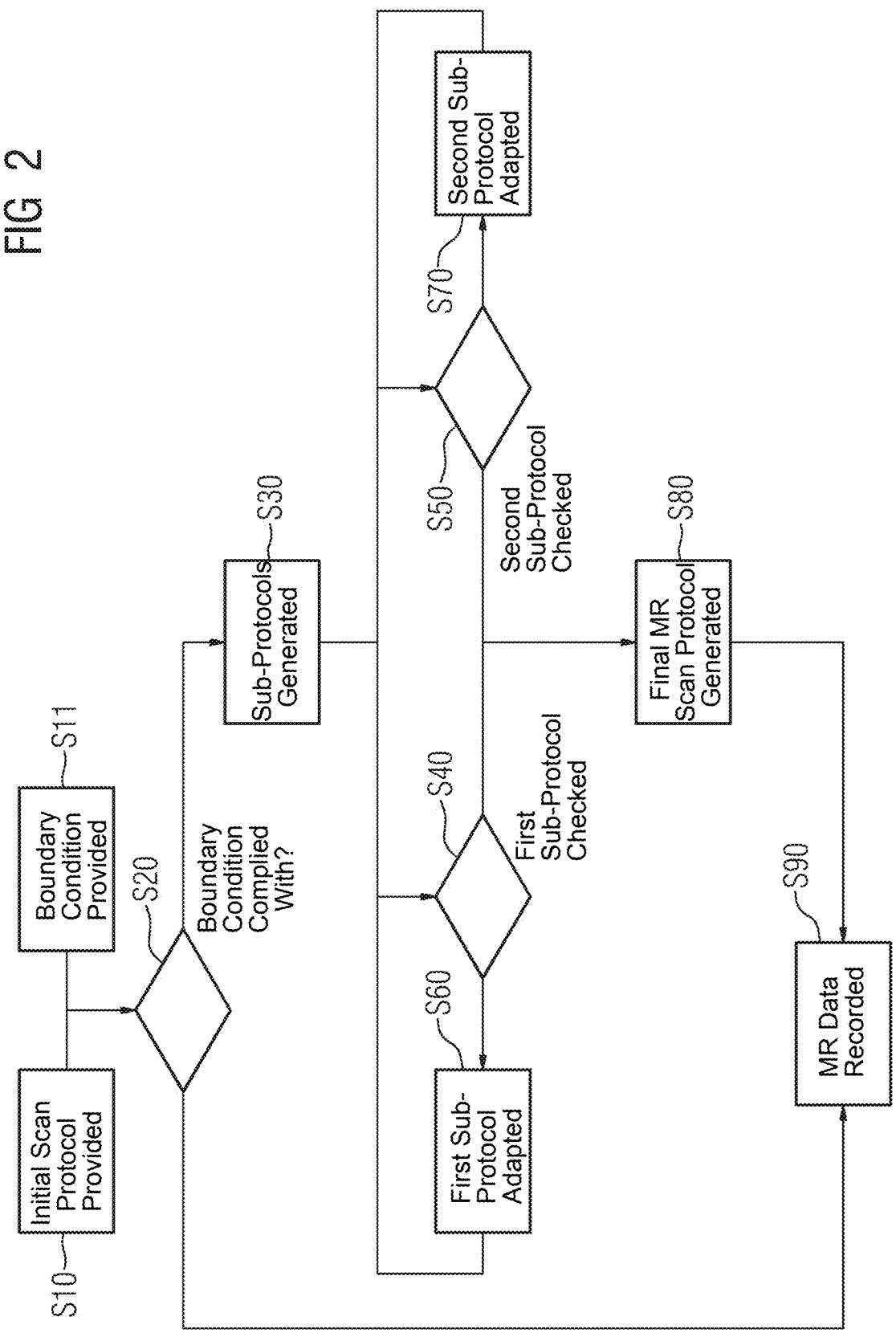
FIG. 2 shows a method for checking an MR scan protocol.

FIG. 2 shows an example of a method for checking an MR scan protocol for recording MR data from a patient by an MR apparatus as to whether at least one boundary condition is complied with when the MR scan protocol is applied.

In S10, an initial MR scan protocol is, for example, provided to the system control unit 22. In S11, the system control unit 22 is, for example, provided with at least one boundary condition that is dependent on the patient 15 and/or the MR apparatus 10. In S20, the system control unit 22 checks, for example, as to whether the at least one boundary condition is complied with when the initial MR scan protocol is applied. If the at least one boundary condition is complied with, in S90, the MR apparatus may record MR data directly according to the initial MR scan protocol.

If the at least one boundary condition is not complied with, in S30, the system control unit 22, for example, generates at least two sub-protocols based on the initial MR scan protocol. Each of the at least two sub-protocols is then checked individually in S40, S50 (e.g., by the system control unit 22) as to whether the at least one boundary condition is complied with when the respective sub-protocol is applied. In the present example, two sub-protocols are assumed. The first sub-protocol is checked in S40, and the second sub-protocol is checked in S50. This provides that the sub-protocols are checked independently of one another.

If the check in S40, S50 reveals that the at least one boundary condition for a sub-protocol of the at least two sub-protocols is not complied with, an attempt is made to adapt the respective sub-protocol such that the at least one boundary condition is complied with when the sub-protocol (e.g., the adapted sub-protocol) is applied. The possibly necessary adaptation of the sub-protocols may, for example, be performed by the system control unit 22. In one embodiment, a solution is sought by a solution algorithm and offered to the operator. For this purpose, for example, the complete sequence of the sub-protocol is simulated (e.g., each individual pulse, such as RF pulse and/or gradient pulse, is taken into account at its time in the sequence).

Therefore, if the check of the first sub-protocol in S40 reveals that the at least one boundary condition is not complied with here, the first sub-protocol is adapted in S60. The adapted sub-protocol is then checked again in S40. Similarly, the second sub-protocol is adapted in S70 if the check in S50 reveals that the at least one boundary condition for the second sub-protocol is not complied with.

If sub-protocols are available, possibly in adapted form, which comply with the at least one boundary condition, a final MR scan protocol (e.g., a single final MR scan protocol) is generated based on these sub-protocols in S80. According to the final MR scan protocol, the MR apparatus 10 records MR data in S90.

The at least one boundary condition provided in S11 and used for the checking in S20, S40, S50 may, for example, include a performance limit of a radio-frequency amplifier 26 of the MR apparatus 10 and/or a performance limit of a gradient coil unit 18 and/or a maximum specific absorption rate of the patient 15 and/or a maximum stimulation of the patient 15.

Figure 3:
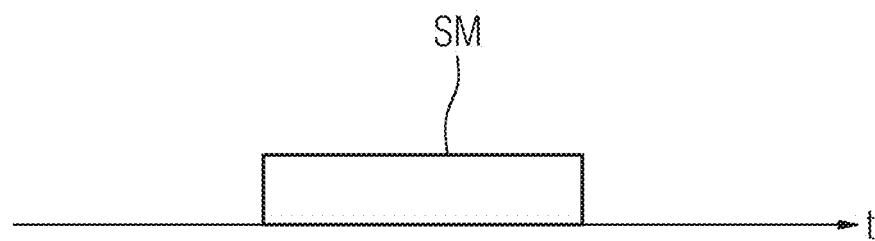
FIG. 3 shows a conflict in the case of non-compliance with a boundary condition.
Figure 3:
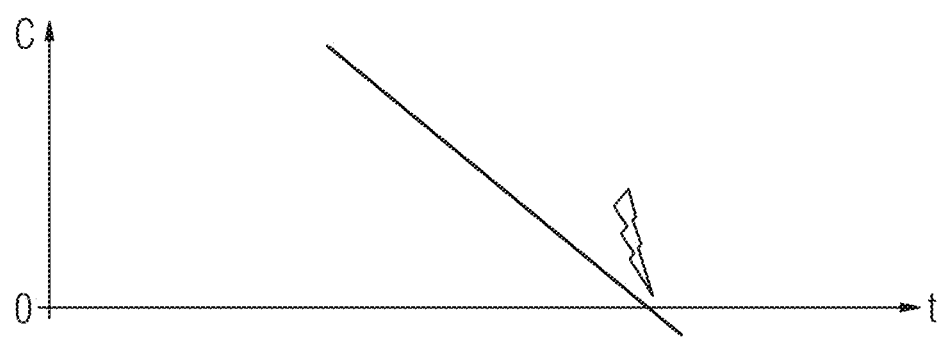

FIG. 3 is intended to explain the at least one boundary condition in the form of a performance limit of a radio-frequency amplifier 26. According to an MR scan protocol, sequence modules SM may be played out by the MR apparatus 10 over the course of time t. Apart from gradient pulses applied by the gradient coil 18, such sequence modules may, for example, also include transmit pulses applied by the radio-frequency antenna unit 20. Application of the transmit pulses causes the radio-frequency amplifier 26 to discharge (e.g., the charge C of the radio-frequency amplifier 26 decreases over time t). As a result, the radio-frequency amplifier 26 may reach a state in which the radio-frequency amplifier 26 is completely discharged and hence is unable to generate any further transmit pulses. This provides that one possible boundary condition for an MR scan protocol consists in organizing the MR scan protocol such that this state does not occur.

Figure 4:
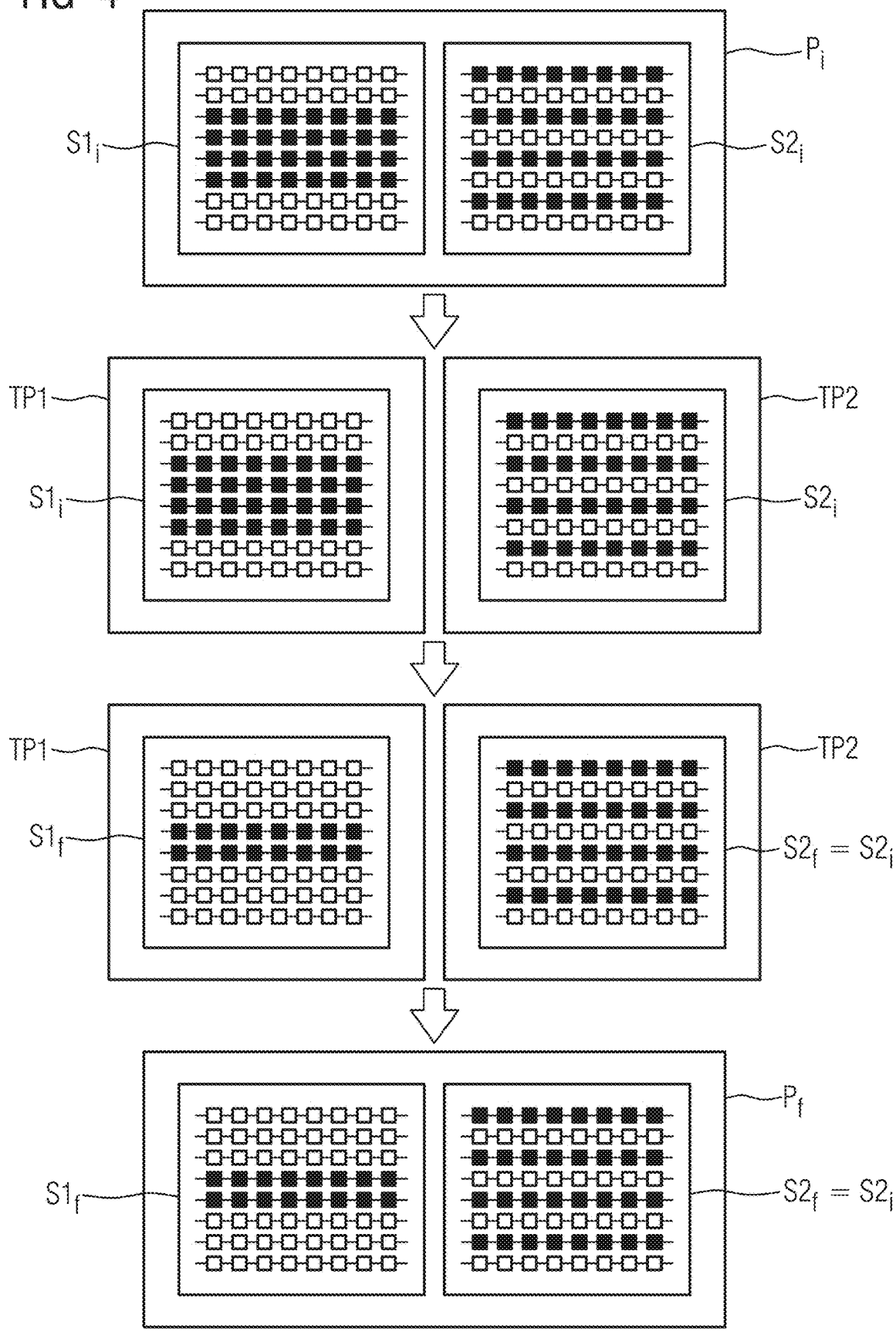
FIG. 4 shows the course of a modification of an initial MR scan protocol.

FIG. 4 shows, by way of example, how an initial MR scan protocol $P_i$ provided in S10 may be converted into a final MR scan protocol. Here, the initial MR scan protocol $P_i$ includes two scan procedures, represented here by a k-space to be scanned in each case. The k-spaces shown have k-space points represented by squares. Herein, a filled square indicates a k-space point to be scanned, and an unfilled square indicates a k-space point that is not to be scanned.

According to a first MR sequence $S1_i$, reference data is to be recorded in the form of four central reference lines. According to a second MR sequence $S2_i$, image data is to be in the form of an incomplete data set in k-space; in this case, only every second k-space line is sampled.

In one embodiment, the reference lines are recording data from a calibration measurement for a PPA method. With PPA, k-space data may be recorded by a plurality of receiving coils. Each of the spatially independent receiving coils carries certain spatial information that may be used to achieve complete spatial encoding via a combination of simultaneously acquired coil data. In the method, a calibration measurement may be performed in one period (hereinafter, referred to as the first period, where the sequence is immaterial). During the calibration measurement, reference data is acquired for predetermined calibration points in k-space with the plurality of receiving coils. The calibration points may, for example, include reference lines in k-space. The reference data for the predetermined calibration points may be acquired simultaneously by the plurality of receiving coils.

At another period, hereinafter referred to as the second period, a further measurement is performed in the context of the PPA method; the actual measurement for determining image data in k-space from which MR maps may be later created by mathematical transformation of the data. During the actual measurement, each receiving coil of the plurality of receiving coils in each case acquires an incomplete data set in k-space. Recording an incomplete data set takes less time than recording a complete data set (e.g., the PPA method in an MR acceleration technique).

Combining the incomplete data sets using the reference data then causes complete data sets to be reconstructed (e.g., the image data is suitable for reconstructing at least one MR map taking into account the reference data). It is then possible to form complete image data sets from these complete data sets using, for example, a Fourier transform. The first period and the second period are different (e.g., the calibration measurement is not performed at the same time as the actual measurement).

In S30, two separate sub-protocols TP1, TP2 are generated from the initial MR scan protocol $P_i$. The first sub-protocol TP1 includes an initial sequence $S1_i$, for recording the reference lines. The second sub-protocol TP2 includes the imaging sequence. The two protocols TP1 and TP2 are sent independently of one another for checking in S40 or S50.

The check reveals either a positive result, the sub-protocol may be performed as it is (e.g., no boundary condition is infringed), or a negative result (e.g., at least one boundary condition is infringed). With the negative result, an adaptation is performed.

In the case depicted in FIG. 4, the check of the first sub-protocol TP1 in S40 reveals, for example, that at least one boundary condition is not complied with. Then, an adaptation is performed in S60. Specifications used for the adaptation are, for example, a minimum flip angle, a maximum repetition time, and/or a minimum number of reference lines, and a sequence in which these are to be changed, and therefore, also as to whether, for example, first the flip angle or first the TR are to be changed. As a result of the adaptation, the number of references lines may, for example, be reduced from four (4) to two (2); this is expressed in a changed final sequence $S1_f$. The adapted sub-protocol may be output to the operator (e.g., by the user interface 23) as a proposal for checking and/or confirmation.

In the case depicted in FIG. 4, the check of the second sub-protocol TP2 in S50 reveals, for example, that at least one boundary condition is complied with. Then, no adaptation is necessary so that the final sequence $S2_f$ for recording the image data is identical to the initial sequence $S2_i$. In S80, the sub-sequences TP1 and TP2 are combined to form a consistent overall protocol, the final MR scan protocol Pf.

Splitting into sub-protocols TP1, TP2 enables complex dependencies between the parts of the recording process to be avoided while still retaining sufficient leeway to render the imaging as highly efficient as possible and without overloading the user interface 23 due to too many parameters.

The methods described above in detail and the MR apparatus depicted are merely example embodiments that may be modified by the person skilled in the art without departing from the scope of the invention. Further, the use of the indefinite article "a" or "an" does not preclude the possibility of the features in question also being present on a multiple basis. Similarly, the term "unit" does not preclude the possibility that the components in question consist of a plurality of interacting sub-components that may also be spatially distributed.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for checking a magnetic resonance (MR) scan protocol, the method being computer-implemented and comprising:
   providing an initial MR scan protocol;
   providing at least one boundary condition;
   generating at least two sub-protocols based on the initial MR scan protocol; and
   checking each of the at least two sub-protocols as to whether the at least one boundary condition is complied with when the respective sub-protocol is applied.

2. A magnetic resonance (MR) apparatus comprising:
   a processor configured to:
      provide an initial MR scan protocol;
      provide at least one boundary condition;
      generate at least two sub-protocols based on the initial MR scan protocol; and
      check each of the at least two sub-protocols as to whether the at least one boundary condition is complied with when the respective sub-protocol is applied.

3. In a non-transitory computer-readable storage medium that stores instructions executable by one or more processors to check a magnetic resonance (MR) scan protocol, the instructions comprising:
   providing an initial MR scan protocol;
   providing at least one boundary condition;
   generating at least two sub-protocols based on the initial MR scan protocol; and
   checking each of the at least two sub-protocols as to whether the at least one boundary condition is complied with when the respective sub-protocol is applied.

4. The method of claim 1, further comprising when, based on the checking, the at least one boundary condition for a sub-protocol of the at least two sub-protocols is not complied with:
   adapting the sub-protocol so that the at least one boundary condition is complied with when the sub-protocol is applied.

5. The method of claim 1, wherein the at least one boundary condition comprises a performance limit of a radio-frequency amplifier of the MR apparatus.

6. The method of claim 1, wherein the at least one boundary condition comprises a performance limit of a gradient coil unit of the MR apparatus, a maximum specific absorption rate of a patient, a maximum stimulation of the patient, or any combination thereof.

7. The method of claim 1, wherein the at least two sub-protocols comprise a sub-protocol for recording reference data, and
wherein the reference data is suitable for performing an MR acceleration technique.

8. The method of claim 1, further comprising:
generating a final MR scan protocol based on the at least two sub-protocols that have been checked.

9. The method of claim 1, further comprising:
recording MR data from the patient according to the at least two sub-protocols that have been checked.

10. The method of claim 1, wherein generating the at least two sub-protocols based on the initial MR scan protocol and the checking of each of the at least two sub-protocols as to whether the at least one boundary condition is complied with when the respective sub-protocol is applied only take place when a preceding check of the initial MR scan protocol reveals that the at least one boundary condition is not complied with when the initial MR scan protocol is applied.

11. The method of claim 4, wherein adapting the sub-protocol comprises specifying a sequence in which predetermined adaptation parameters are changed for compliance with the at least one boundary condition.

12. The method of claim 7, wherein the MR acceleration technique is a parallel imaging technique.

13. The method of claim 7, wherein the at least two sub-protocols comprise a sub-protocol for recording image data, and
wherein the image data is suitable for reconstructing at least one MR map taking into account the reference data.

14. The method of claim 4, further comprising:
generating a final MR scan protocol based on the adjusted sub-protocol.

15. The method of claim 4, further comprising:
recording MR data from the patient according to the adapted sub-protocol.

16. The method of claim 8, further comprising:
recording MR data from the patient according to the final MR scan protocol.

* * * * *